April 15, 1958 C. J. BENSON ET AL 2,830,841
SELF-RETRACTING HOOK MECHANISM
Filed June 30, 1952 5 Sheets-Sheet 1
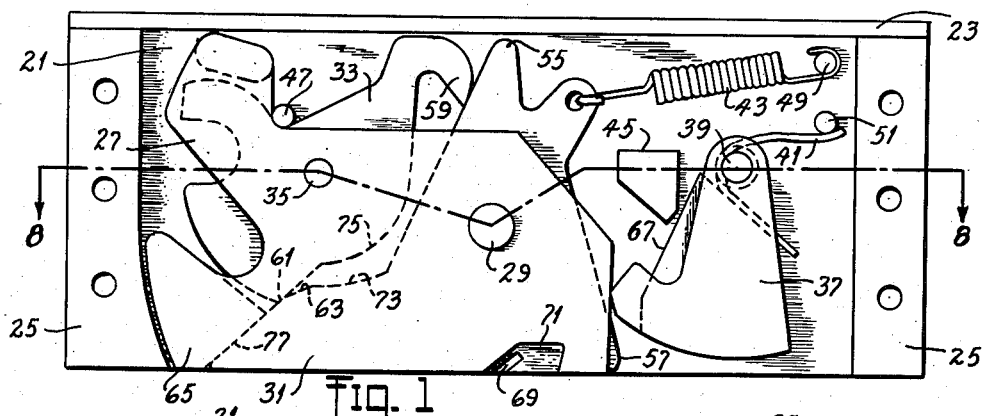
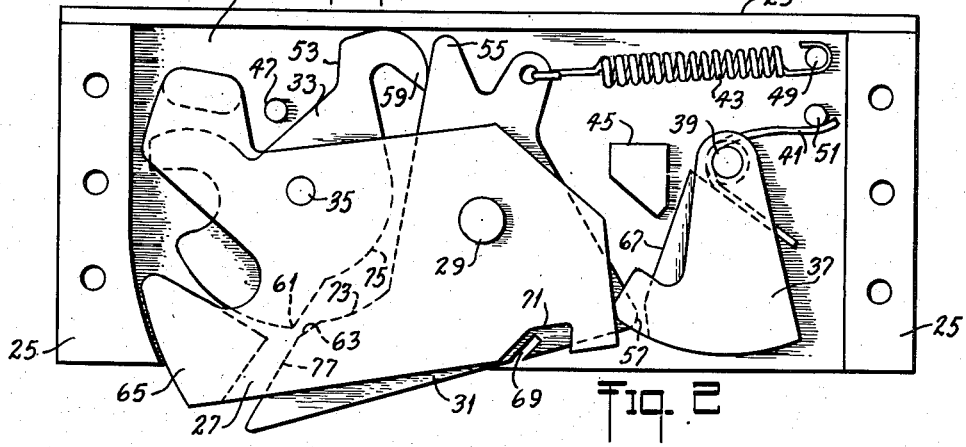
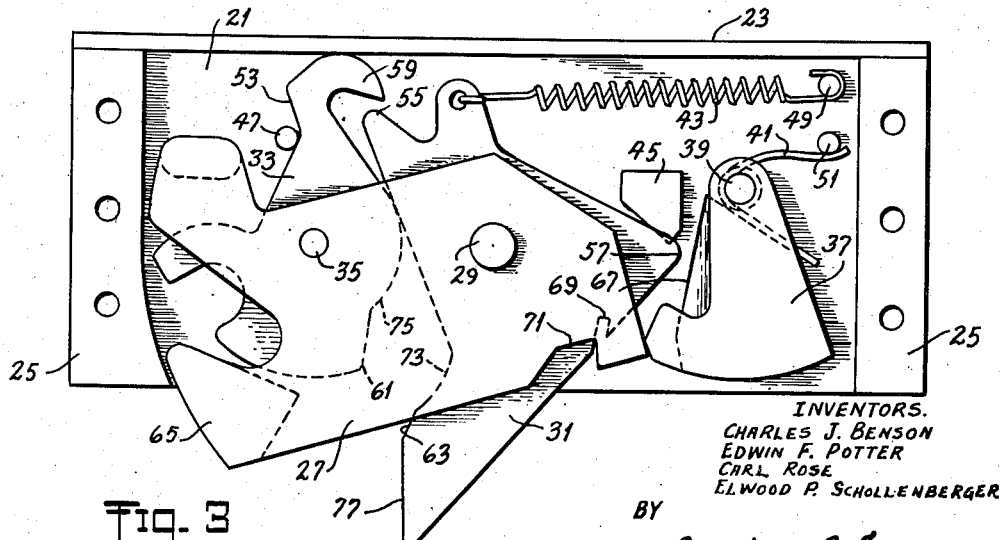
INVENTORS.
CHARLES J. BENSON
EDWIN F. POTTER
CARL ROSE
ELWOOD P. SCHOLLENBERGER
BY
Roderick B Jones
THEIR ATTORNEY

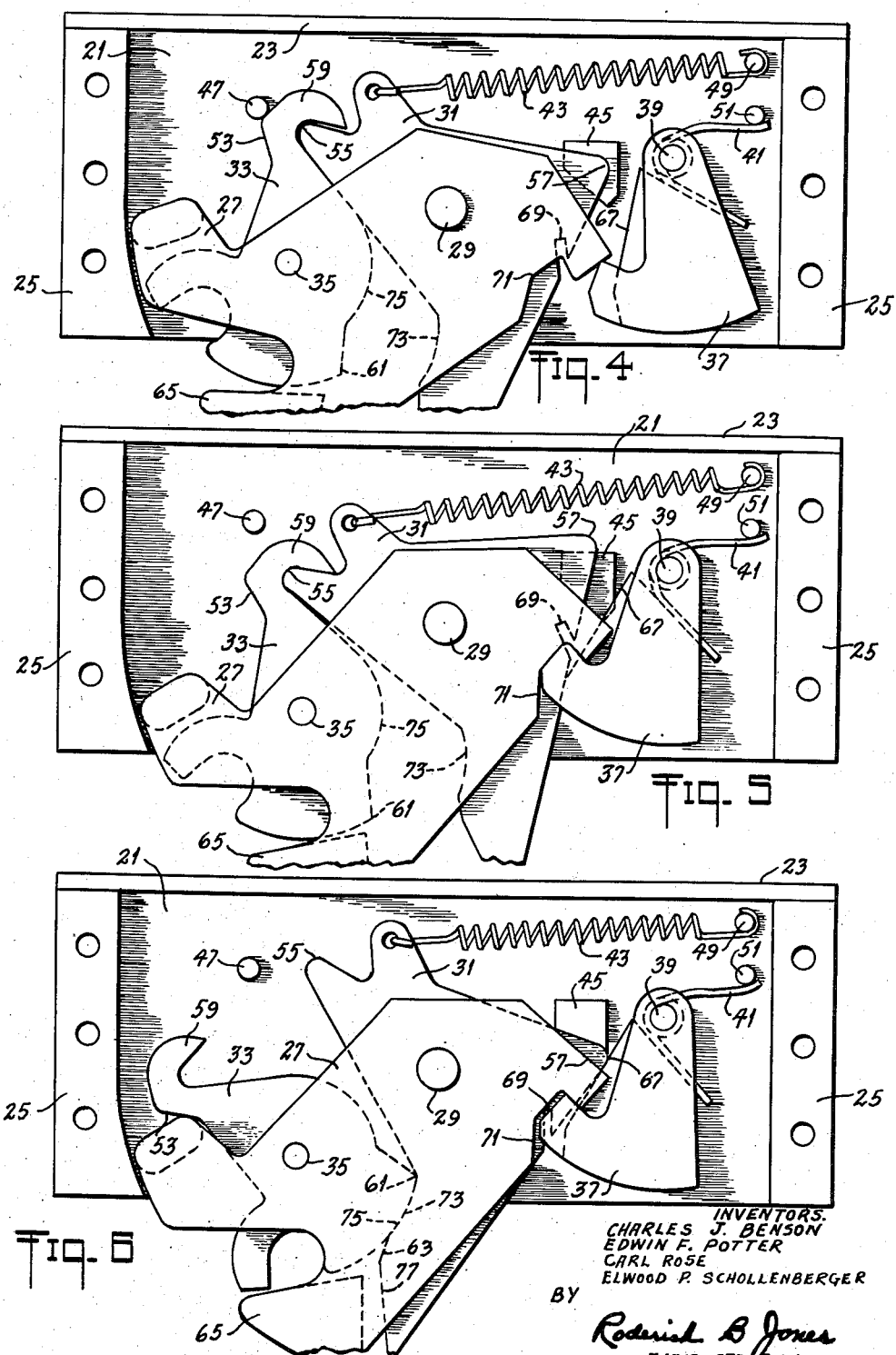

April 15, 1958 C. J. BENSON ET AL 2,830,841
SELF-RETRACTING HOOK MECHANISM
Filed June 30, 1952 5 Sheets-Sheet 3
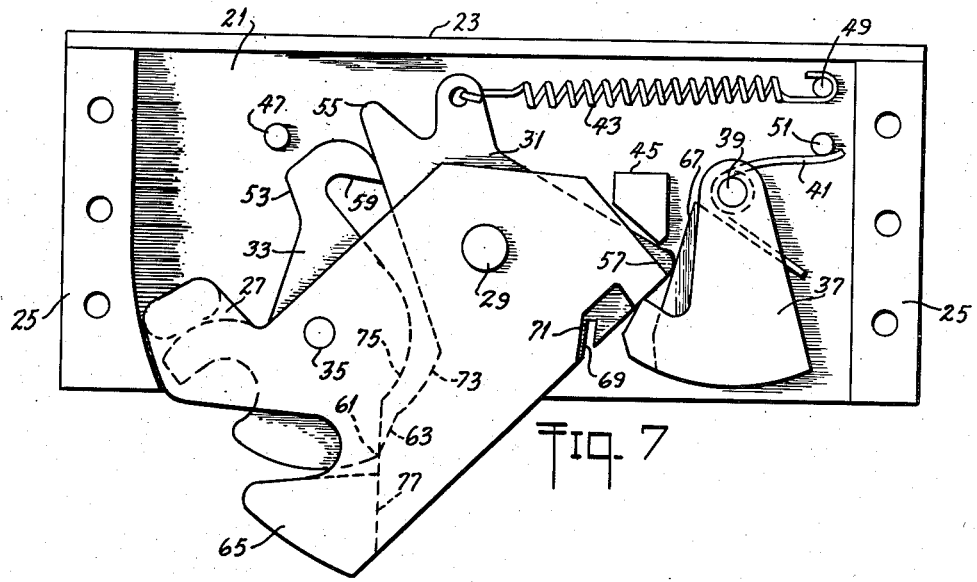
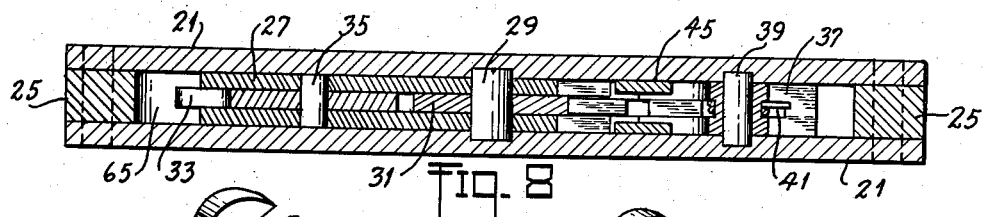
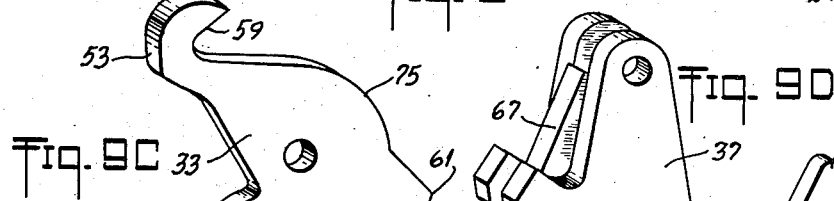
INVENTORS.
CHARLES J. BENSON
EDWIN F. POTTER
CARL ROSE
ELWOOD P. SCHOLLENBERGER
BY
Roderick B. Jones
THEIR ATTORNEY

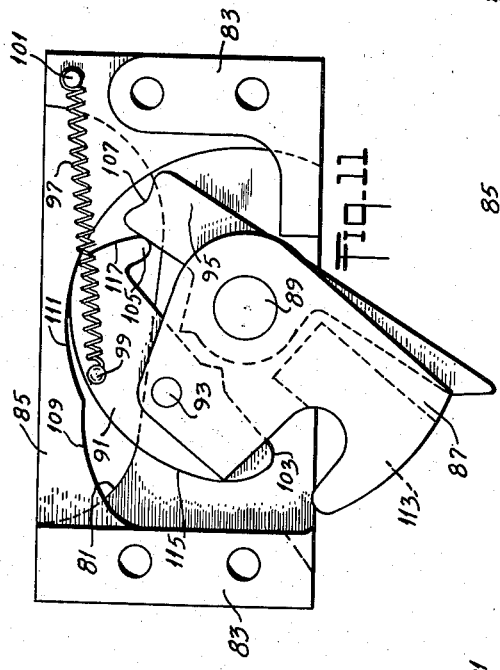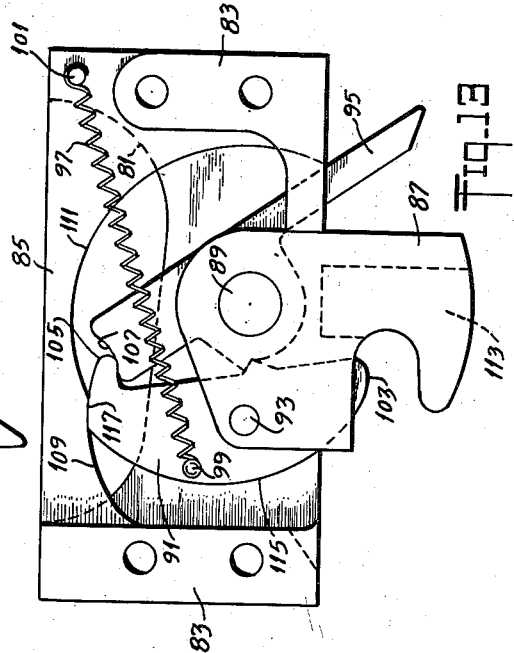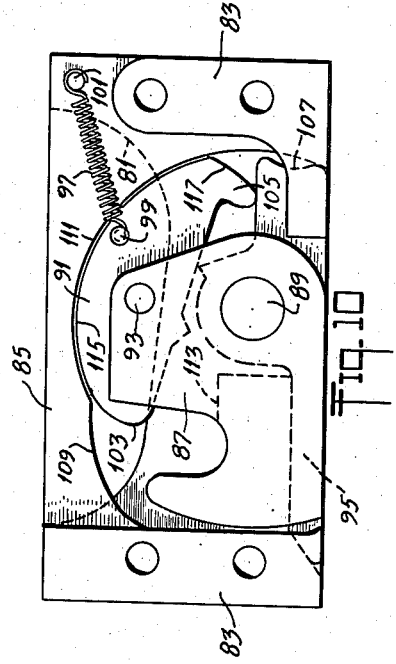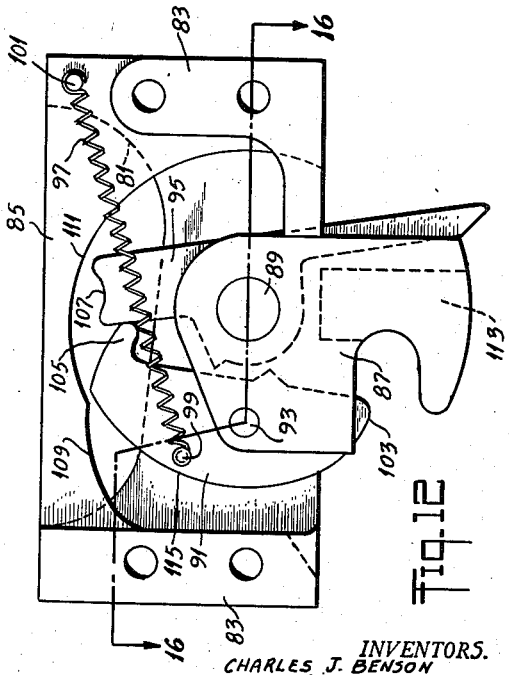

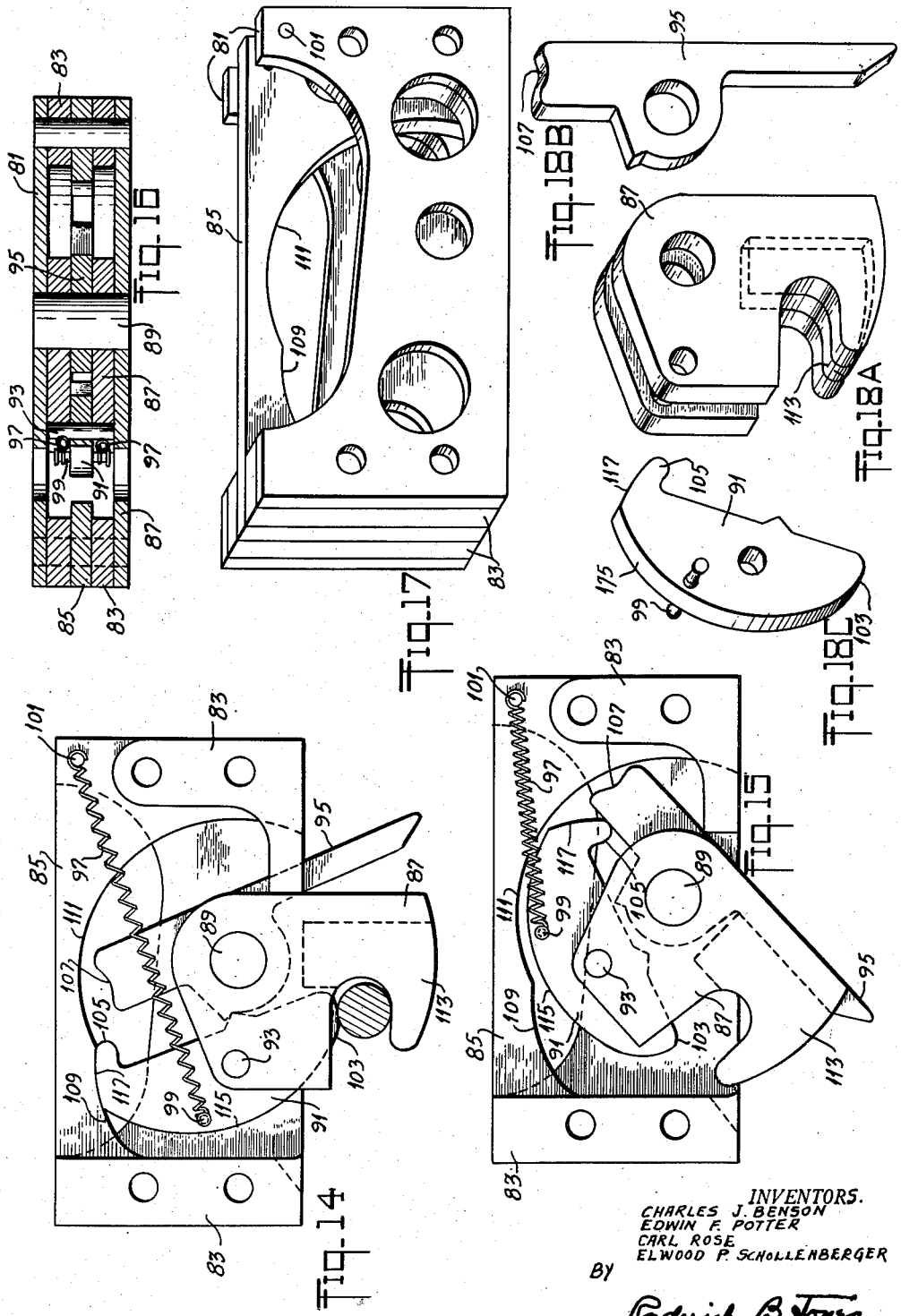

United States Patent Office 2,830,841
Patented Apr. 15, 1958

2,830,841
SELF-RETRACTING HOOK MECHANISM

Charles J. Benson, Philadelphia, Edwin F. Potter, Upper Darby, Carl Rose, Philadelphia, and Elwood P. Schollenberger, Springfield, Pa.

Application June 30, 1952, Serial No. 296,513

2 Claims. (Cl. 294—83)

(Granted under Title 35, U. S. Code (1952), sec. 266)

The invention described herein may be manufactured and used by or for the Government of the United States of America for governmental purposes without the payment of any royalties thereon or therefor.

This invention relates to new and useful improvements in a releasing device and more particularly to a device such that after an object has been ejected from a forward hook mechanism mounted on supporting structure such as an airplane, the attaching mechanism is automatically retracted within the supporting structure so that the external surface of said supporting structure becomes free of any of the attaching members. The present invention is designed to be used in conjunction with a hook mechanism of the type that retains the shackle thereby, preventing the stores from moving out of either hook.

Previously, external stores such as bombs, gas tanks, rescue equipment, jato (jet-assist-take-off) bottles, etc., were attached to airplanes by means of fixed hook structures or retractable hooks that were articulated. The fixed hooks did not retract to form a flush surface with the airplane when their intended purpose had been fulfilled. These projections were not objectionable when the aircraft travelled at relatively slow speeds. However, with the advent of high-speed aircraft, airflow becomes critical and any projection that interferes with the smooth flow of air over the surface of an object such as an airfoil passing through the air causes an additional drag that reduces the aerodynamic efficiency. The retractable hooks that are articulated are not flexible enough to permit installation of present external stores having variable distances between suspension lugs. Moreover, the articulated hooks require actuation linkage ties to the forward hook and as such are not adaptable to variable suspension lug systems.

With this in mind, the principal object of this invention is to provide a rear hook releasing device that retracts within or flush with its supporting surface so that all projecting arms of said device are withdrawn within or flush with its supporting area immediately after the attached object is released and ejected from its forward fastening and said device.

Another object is to provide a mechanism that will automatically retract the hook by the act of sliding an object out of the hook throat.

A further object of the invention is to provide a hook, when retracted, will assume a position that will be flush with and form part of the aerodynamic contour of the airplane.

A still further object of the invention is to provide a mechanism that will remain in extended position when attaching a load.

A still further object of the invention is to provide a device that is compact and small in size to enable easy installation and removal for maintenance purposes, and permitting installation where very little space is available.

These and other objects of the invention and the various features and details of construction and operation thereof are hereinafter more fully set forth and described with reference to the accompanying drawings in which like numbers refer to like parts.

Fig. 1 is a side-elevational view of the mechanism in retracted position, one of the side plates being removed.

Fig. 2 is a side-elevational view of the mechanism showing the camming action of the lever against the latch.

Fig. 3 is a side-elevational view of the mechanism showing the lever bearing against the trigger.

Fig. 4 is a side-elevational view of the mechanism showing the projection of the lever engaging the throat of the trigger.

Fig. 5 is a side-elevational view of the mechanism in extended position with the trigger in the open position.

Fig. 6 is a side-elevational view of the mechanism in extended position showing the trigger in the closed or loaded position.

Fig. 7 is a side-elevational view of the mechanism after an object has been removed or released.

Fig. 8 is a longitudinal sectional view of the mechanism in the retracted position taken along the line 8—8 of Fig. 1.

Figs. 9A, 9B, 9C and 9D form an exploded view of the load-supporting means or hook, the lever, the trigger and the latch elements.

Fig. 10 is a side-elevational view of another modified form of the invention, the mechanism being in the retracted position.

Fig. 11 is a side-elevational view of the mechanism of Fig. 10, showing the action between the crescent-shaped latch and cam plate as the hook is rotated into extended position.

Fig. 12 is a side-elevational view of the same mechanism with the load-supporting means in extended position prior to locking.

Fig. 13 is a side-elevational view of the mechanism with the load-supporting means in the locked extended position prior to loading.

Fig. 14 is a side-elevational view of the mechanism in the extended position with a load attached.

Fig. 15 is a side-elevational view of the mechanism after release of the load.

Fig. 16 is a sectional view of the mechanism, taken along line 16—16 of Fig. 12, with the load-supporting means in extended position prior to locking.

Fig. 17 is a perspective view of the mechanism assembly.

Figs. 18A, 18B and 18C form an exploded view of the load-supporting means, working lever and crescent-shaped latch elements.

Consideration of one type of self-retracting mechanism will best be understood by referring to Fig. 1 through Fig. 9 inclusive. This device consists of four major elements mounted on a frame or housing, namely, a load-supporting means or hook 27 rotatable on a shaft 29, a lever 31 rotatable on said shaft, a trigger 33 rotatable on a pin 35 of said load-supporting means and a latch 37 rotatable on a pin 39 of said frame. (See Figs. 9A, 9B, 9C and 9D.) The frame or housing is composed of two side plates 21 separated by two frame spacers 25 and a top plate 23.

In Fig. 1, the mechanism is shown in the retracted position. Said load-supporting means is retained in the retracted position by the action of said lever bearing against a stopblock 65 of said load-supporting means. Said latch also bears against said load-supporting means and tends to hold said load-supporting means in the retracted position. Said mechanism can be extended by engaging a slot 69 in said lever with a screw-driver or other similar tool and pushing inward. This act extends said lever an amount sufficient to be grasped and rotated counterclockwise about said shaft 29. (See Fig. 2.)

Said rotation causes projection 55 of said lever, bearing on hook 59 of said trigger, to rotate said trigger counterclockwise about pin 35 to a position where said projection clears said hook. (See Fig. 3.) At this point said lever comes to bear directly on said trigger and continued rotation of said lever causes the load-supporting means 27 to rotate as a unit into extended position.

During the above-mentioned operation cam surface 53 of said trigger engages and slides over a stop pin 47 fixed in said frame, thereby rotating said trigger clockwise relative to said load-supporting means until said hook 59 comes to rest nestled about projection 55. (See Fig. 4.) Said load-supporting means, still rotating, comes to bear against a compression stop 45 at which time said latch 37 engages a heel notch 71 in said load-supporting means, securely locking the mechanism in the extended position. Lever 31, upon being released, is restrained by hook 59. (See Fig. 5.)

The mechanism is loaded by inserting a shackle (not shown) of a store or object into the throat of the load-supporting means. Said shackle causes said trigger to be rotated counterclockwise causing said hook 59 to release the lever. A tension spring 43 is attached to said lever and to a pin 49 fixed in said frame. The lever then rotates clockwise under the influence of said spring until it comes to rest on a point 61 of the trigger. Said trigger continues to be rotated until said shackle of the store is fully seated in the throat of said load-supporting means. (See Fig. 6.) (It must be borne in mind that this mechanism is to be used in conjunction with a release mechanism of the type that securely retains the forward shackle of the store, thereby preventing the shackles from leaving either throat.)

Positive release or ejection of the forward shackle attached to the store forces the rear shackle from the throat of said load-supporting means and rotates the trigger clockwise about pin 35 causing mating surface 75 of said trigger to slide over mating surface 73 of said lever. When point 61 of said trigger reaches slope 63 of the lever, said lever, under the influence of spring 43, begins to rotate clockwise forcing said trigger to follow said rear shackle. Meanwhile, the rotation of lever 31 causes a heel cam surface 57 of said lever to bear on surface 67 of latch 37 thereby rotating said latch counterclockwise on pin 39. A torsion spring 41 is mounted on pin 39 and bears against said latch and a pin 51 fixed on the frame. When surface 77 of said lever comes to bear on stop block 65, the shackle has travelled far enough to insure its freedom from the load-supporting means. At this point said latch is fully released from heel notch 71 thereby allowing said load-supporting means to be rotated clockwise by said lever until all the elements of the mechanism are fully retracted and flush with the counter of the airplane.

An alternate type of self-retracting mechanism will best be understood by referring to Figs. 10 through Fig. 18 inclusive. This device consists of four major elements mounted on a frame assembly, namely, a load-supporting means or hook 87 rotatable on a shaft 89, a crescent-shaped latch 91 rotatable on a pin 93 of said load-supporting means, a lever 95 rotatable on said shaft, and a cam plate 85 having joining arcuate cam surfaces 109 and 111. Two springs 97 are connected at one end to a pin 99 of said latch and anchored at the other end to a pin 101 mounted on said frame assembly. Said frame assembly is composed of a center cam plate 85 between two spacer plates 83, all riveted between two side plates 81. A thin metal case or housing, not shown, is designed to retain said mechanism. (See Figs. 17, 18A, 18B and 18C.)

In Fig. 10, the mechanism is shown in the retracted position. Said load-supporting means is retained in the retracted position by the action latch 91 mounted on pin 93 of the load-supporting means. Said mechanism can be extended by pressing a screw-driver inward against one end of said lever 95. This act extends said lever an amount sufficient to be grasped and rotated counterclockwise about said shaft 89. (See Fig. 11.) Said rotation causes said lever to bear against the toe 105 of said latch and rotate both latch and load-supporting means counterclockwise. As the latch is rotated, the cam surface 115 of said latch cams against the cam surface 111 of said cam plate until the lever is rotated to the position shown in Fig. 13.

Continued rotation of said lever forces said latch to be rotated to a position where its camming surface 117 cams against camming surface 109 of said cam plate. At the same time the toe 105 of said latch engages a heel notch 107 of said lever thereby locking said load-supporting means in the "ready" position. (See Fig. 13.) (It can be seen that rotation of said load-supporting means to extended position is limited by said spacer plates 83.)

The mechanism is loaded by inserting the rear lug of the store in the throat of said load-supporting means. Said lug bears against the tip 103 of the latch 91 and forces both said latch and lever to rotate, the former in a counterclockwise direction and the latter in a clockwise direction. This action disengages toe 105 from heel notch 107. The cam surface 117 cams against cam surface 109. (See Fig. 14.) Said mechanism will remain in the extended position as long as said lug store is in the throat of said load-supporting means.

As the forward hook mechanism releases the store and the store moves aft either under the action of air loads or positive ejection by the forward hook, said lug moves out of the throat of said load-supporting means, enabling springs 97 to pull said latch away from the cam surface 109 of cam plate 85 to the position indicated in Fig. 15. Continued rotation of said latch due to the influence of said springs causes the load-supporting means to rotate into retracted position flush with the contour of the airplane. A spacer block 113 mounted on throat end of said load-supporting means limits the rotation of the lever in the retracted position.

From the foregoing description and illustration of the present invention it is apparent that a self-releasing mechanism of simple design wherein the rear lug or shackle of a load can be installed quickly and easily, and, when positive ejection of the load is accomplished by a forward ejecting device, said mechanism will automatically retract to a position flush with the contour of the airplane.

The invention is not to be construed as limited to the particular rear location described herein, since this is regarded to be illustrative rather than restrictive. For example, the device can be located forward of the ejecting type hook mechanism, said relative location being determined by the suspension system to be used, or installed to suit any suspension lug configuration desired.

What is claimed:

1. A self-retracting hook device for attaching external stores having a lug thereon to an aircraft comprising a frame having a shaft thereon, load supporting means rotatably mounted on said shaft and adapted to accept such lug, a heel notch in said load-supporting means, a lever rotatably mounted on said shaft and adapted to rotate said load-supporting means into a position extended from said frame, a trigger rotatably mounted on a pin of said load-supporting means and adapted to be rotated by said lever means, a spring-actuated latch rotatably mounted on a pin of said frame for engaging said heel notch when said load supporting means is in said extended position, a heel cam surface on said lever for unseating said latch from said heel notch, a stop block on said load-supporting means, a spring urging said lever toward said stop block, a compression stop mounted on said frame to limit movement of the load-supporting means into extended position, a stop pin on said frame to limit movement of said load-supporting means into a position flush with said frame, said trigger having a tail hook for engaging a point on said lever during rotation of said load-supporting means to extended position and further adapted to disengage said lever upon insertion of such lug into said load-supporting means, arcuate mating surfaces on said trigger and said lever, a cam surface on said lever, and a cam surface on said tail hook for cooperation with said stop pin, whereby upon removal of such lug from said load-supporting means said lever will automatically disengage said latch and rotate said load-supporting means to a position flush with said frame.

2. A self-releasing device comprising a frame having a shaft thereon, load-supporting means adapted to be mounted rotatably on said shaft within said frame, lever means to rotate said load-supporting means to a position exterior of said frame, stopping means to limit rotation of said load-supporting means to said position exterior of said frame, latch means rotatably mounted on a shaft within said frame actuated by said lever means and said load-supporting means for securing said load-supporting means in said exterior position releasably against rotation, trigger means rotatably mounted on a pin of said load-supporting means and adapted to actuate said lever means for disengaging said latch from said load-supporting means, and spring means attached to said lever means to rotate automatically said load-supporting means to a position within said frame upon release of a stored object from said load-supporting means.

References Cited in the file of this patent

UNITED STATES PATENTS

| | | |
|---|---|---|
| 997,438 | Clough | July 11, 1911 |
| 1,434,991 | Carey | Nov. 7, 1922 |
| 2,426,221 | Karp et al. | Aug. 26, 1947 |
| 2,502,416 | Brown | Apr. 4, 1950 |
| 2,544,830 | Grill et al. | Mar. 13, 1951 |
| 2,547,313 | Gosser | Apr. 3, 1951 |

FOREIGN PATENTS

| | | |
|---|---|---|
| 197,275 | Canada | Feb. 17, 1920 |